(12) United States Patent
Bellet et al.

(10) Patent No.: US 9,963,999 B2
(45) Date of Patent: May 8, 2018

(54) AIRCRAFT PROPULSION ASSEMBLY

(71) Applicant: SAFRAN NACELLES, Gonfreville L'Orcher (FR)

(72) Inventors: François Bellet, St Wandrille Rancon (FR); Cédric Renault, Montivilliers (FR); Jérémie Rabineau, Le Havre (FR)

(73) Assignee: SAFRAN NACELLES, Gonfreville L'Orcher (FR)

( * ) Notice: Subject to any disclaimer, the term of this patent is extended or adjusted under 35 U.S.C. 154(b) by 0 days. days.

(21) Appl. No.: 15/386,954

(22) Filed: Dec. 21, 2016

(65) Prior Publication Data
US 2017/0101895 A1  Apr. 13, 2017

Related U.S. Application Data

(63) Continuation of application No. PCT/FR2015/051806, filed on Jul. 1, 2015.

(30) Foreign Application Priority Data

Jul. 3, 2014  (FR) ...................................... 14 56408

(51) Int. Cl.
*F01D 25/24* (2006.01)
*B64D 27/16* (2006.01)
*F02C 9/18* (2006.01)

(52) U.S. Cl.
CPC ............. *F01D 25/24* (2013.01); *B64D 27/16* (2013.01); *F02C 9/18* (2013.01); *F05D 2220/323* (2013.01)

(58) Field of Classification Search
CPC .......... F01D 25/04; F01D 25/24; F01D 25/26; F01D 25/265; F01D 11/003; F02C 7/20; F02C 7/28; F05D 2260/941
See application file for complete search history.

(56) References Cited

U.S. PATENT DOCUMENTS

| 4,754,983 A * | 7/1988 | Kruger | F01D 5/026 |
| | | | 277/422 |
| 2004/0062640 A1* | 4/2004 | Darkins, Jr. | F01D 11/08 |
| | | | 415/134 |
| 2015/0292360 A1* | 10/2015 | Hayton | F02K 1/80 |
| | | | 415/214.1 |

FOREIGN PATENT DOCUMENTS

| EP | 0787895 | 8/1997 |
| EP | 1568868 | 8/2005 |
| EP | 1905689 | 4/2008 |
| WO | 2010/007226 | 1/2010 |

OTHER PUBLICATIONS

International Search Report for International Application PCT/FR2015/051806, dated Oct. 21, 2015.

* cited by examiner

Primary Examiner — Jessica B Wong
(74) Attorney, Agent, or Firm — Burris Law, PLLC

(57) ABSTRACT

The disclosure relates to an aircraft propulsion assembly comprising a bypass turbojet engine equipped with a nacelle, the bypass turbojet engine including a structure defining a first part of a secondary flow path for channeling secondary flow, and the nacelle having a structure defining a second part of the secondary flow path. The structure of the nacelle defining the second part of the secondary flow path is arranged such that the first part and the second part of the secondary flow path are angularly offset around a longitudinal axis of the engine when the engine is shut down/stopped.

16 Claims, 2 Drawing Sheets

AIRCRAFT PROPULSION ASSEMBLY

CROSS-REFERENCE TO RELATED APPLICATIONS

This application is a continuation of International Application No. PCT/FR2015/051806, filed on Jul. 1, 2015, which claims the benefit of FR 14/56408 filed on Jul. 3, 2014. The disclosures of the above applications are incorporated herein by reference.

FIELD

The present disclosure relates to to an aircraft propulsion unit, the propulsion unit being constituted by a turbojet engine and a nacelle.

BACKGROUND

The statements in this section merely provide background information related to the present disclosure and may not constitute prior art.

An aircraft is propelled by several turbojet engines each housed within a nacelle, each nacelle further accommodating an assembly of additional actuating devices linked to its operation and ensuring various functions when the turbojet engine is in operation or stopped.

The modern nacelles are intended to accommodate a bypass turbojet engine capable of generating, by means of the fan blades in rotation, a flow of hot gases (also called primary flow) and a flow of cold air (also called secondary flow) witch circulates outside the turbojet engine through an annular passage, also called flow path, formed between two concentric walls of the nacelle. The primary and secondary flows are ejected from the turbojet engine by the rear of the nacelle.

A turbojet engine nacelle generally has a tubular structure including, from upstream to the downstream (relative to the direction of the cold and hot flows):

a front section, or air inlet, located in front of the turbojet engine;
a median section, intended to surround a fan module of the turbojet engine;
a rear section, intended to surround a high-pressure module, which in particular includes the combustion chamber of the turbojet engine, and generally embarking thrust reversal means;
an ejection nozzle, whose outlet is located downstream of the turbojet engine.

The rear section generally has a fixed external structure, called "Outer Fixed Structure" (OFS), which defines, with a concentric internal structure, called "Inner Fixed Structure" (IFS), a downstream portion of the secondary flow path serving to channel the flow of cold air. The rear section is positioned downstream of a fan module of the turbojet engine which comprises in particular: a fan casing (inside which the fan is contained) and an intermediate casing. The intermediate casing includes a hub and an outer annular casing, as well as radial link arms therebetween.

Each propulsion unit of the aircraft is thus formed by a nacelle and a turbojet engine, and is suspended from a fixed structure of the aircraft, for example under a wing or on the fuselage, by means of a pylon or a mast fastened to the turbojet engine or to the nacelle.

It is thus observed that an aircraft propulsion unit integrates functional subassemblies likely to enter in relative movements, and between which it is suitable to manage the sealing.

In particular, it is important that the rear section of the nacelle, which delimits the secondary flow path, can be correctly aligned with the intermediate casing, with which it cooperates to channel the flow of cold air without leakage and without aerodynamic losses. Such a leakage would be particularly harmful, because a nacelle is designed and dimensioned to withstand the pressure exerted by the cold flow, in the case where it is correctly channeled. In contrast, the nacelle is not designed to withstand the forces generated by the pressure exerted by an air leakage of the secondary flow path towards the turbojet engine. Such a leakage can thus lead to a detachment of the inner structure of the nacelle. In view of these constraints, it is therefore essential to provide for a sealing barrier between the upstream portion of the rear section and the turbojet engine, in order to prevent any leakage of the secondary flow path towards the turbojet engine.

However, the sealing between the two covers and the turbojet engine presents a particular problem. First of all, the elements constituting the rear section of the nacelle are, in operation, animated by axial and radial movements relative to the turbojet engine. Given the large dimension of the concerned parts, these relative movements can, in operation, result in important displacements.

On the other hand, in operation, during the flight phases, the engine also undergoes deformations. In particular, the torsional forces generated by the rotation at very high speed of the fan blades lead the engine to be deformed about its longitudinal axis. This torsional movement, known under the name of "fan twist," leads to an angular offset between the front part (the fan module, including in particular the intermediate casing) and the rear part (including in particular the combustion chamber) of the engine.

This angular offset is consequently also induced between the intermediate casing and the inner fixed structure. A gasket interposed between the inner fixed structure and the turbojet engine must therefore create a sealing barrier whatever the relative position of the inner fixed structure with respect to the turbojet engine, and for that, it must have a high crushing amplitude.

However, even by providing for such a gasket, the angular deformation of the engine in operation has severe disadvantages, among which is the reduction of the aerodynamic qualities of the secondary flow path. Indeed, the alignment of the inner fixed structure of the intermediate casing, which is correct when the engine is stopped, may become defective in flight. Indeed, the angular offset (about the longitudinal axis of the engine) between the inner fixed structure and the engine results in a deviation between some engine walls located in the flow of cold air when the engine is in operation, and which should normally be aligned with corresponding walls of the inner fixed structure. These walls are for example constituted by the outer surfaces of the link arms of the intermediate casing (and in particular those located in the positions called "6h00" and "12h00" positions. These alignment deviations generate a discontinuity of the aerodynamic lines of the secondary flow path, which greatly reduces the aerodynamic qualities of the secondary flow path.

SUMMARY

The present disclosure relates to an aircraft propulsion unit, including a bypass turbojet engine equipped with a nacelle, the turbojet engine including a structure defining a first portion of the secondary flow path intended to channel the secondary flow, the nacelle including a structure defining a second portion of the secondary flow path, the assembly being characterized in that the structure of the nacelle defining the second portion of the secondary flow path is arranged so that the first portion and the second portion of the secondary flow path are offset angularly about the longitudinal axis of the engine when the engine is stopped.

In accordance with the present disclosure, when the engine is stopped, there is an angular offset about the longitudinal axis of the engine between the structure of the nacelle defining the second portion of the secondary flow path and the structure of the turbojet engine defining the first portion of this flow path. Thus, by providing for an initial angular offset between the portion of the secondary flow path delimited by the engine and the portion of the secondary flow path delimited by the nacelle, the torsional deformation undergone by the engine during the flight phases will be taken into account. In other words, the alignment between the two portions of the secondary flow path is voluntarily deteriorated when the engine is stopped, in order to be improved when the engine is in cruising speed.

In one form, the first portion of the secondary flow path is delimited in particular by an intermediate casing of the engine.

In another form, the second portion of the secondary flow path is delimited by the rear section of the nacelle.

In still another, the second portion of the secondary flow path is delimited by an inner fixed structure and an outer fixed structure.

In yet another, a gasket is interposed between the inner fixed structure and the engine.

In one form, the angular offset value is comprised between 2° and 10°.

In one embodiment, the angular offset value is comprised between 2° and 5°.

In another form, the angular offset value is comprised between 5° and 10°.

The present disclosure also concerns an aircraft including one or several propulsion unit(s) as defined above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
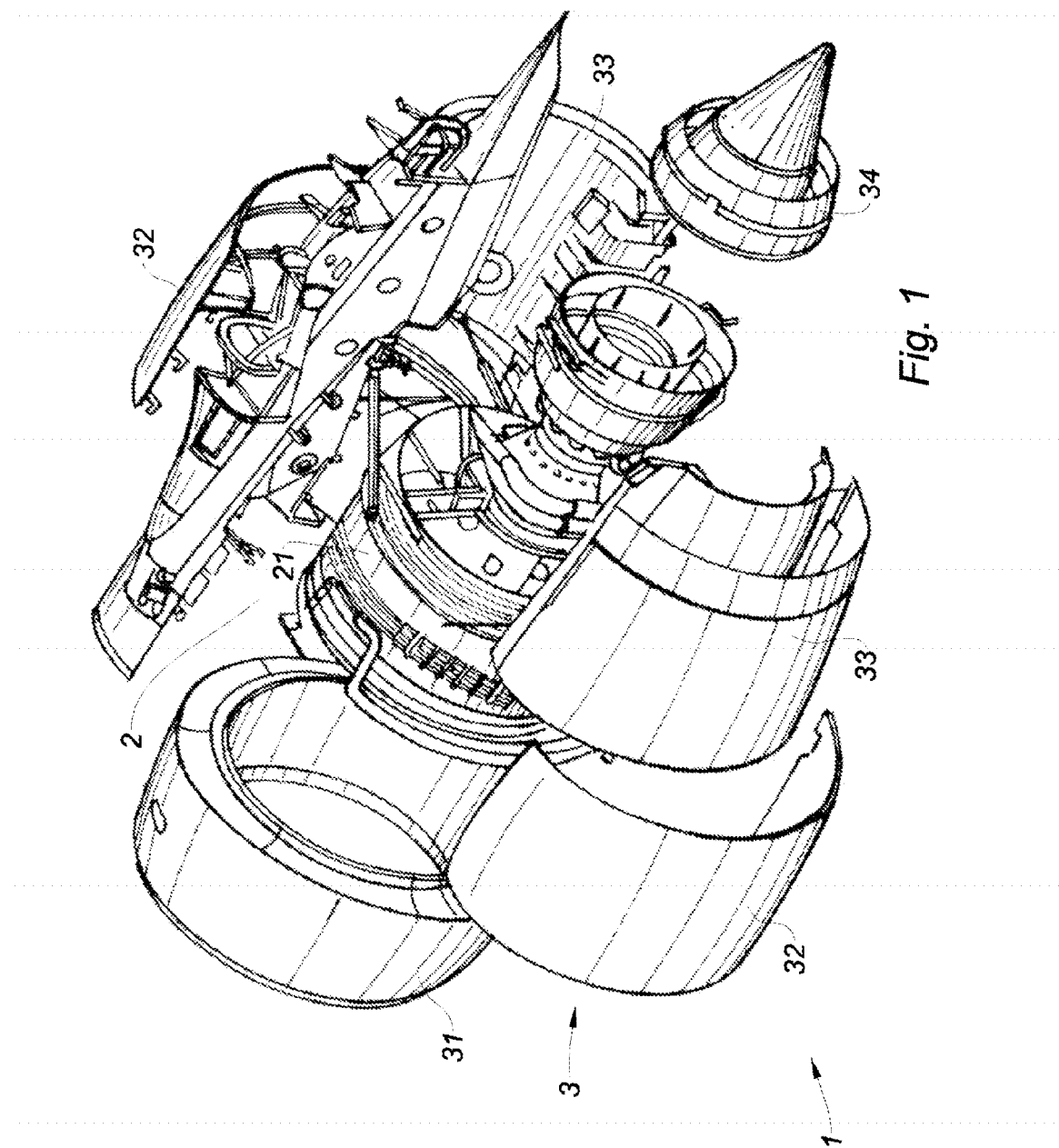
FIG. 1, shows one form of a propulsion unit in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows an exploded view of a propulsion unit 1, including a bypass turbojet engine 2 and a nacelle 3.

The turbojet engine 2 includes a fan module, including a fan casing and an intermediate casing. The fan casing has a general cylindrical shape with a circular section, and surrounds the fan of the turbojet engine, whose rotation serves in particular to generate the secondary flow. The intermediate casing 21 is disposed downstream of the fan casing and in particular includes an outer annular casing defining an upstream portion of the flow path of cold flow, or secondary flow path, of the engine. The annular casing is linked to a hub of the intermediate casing by radial link arms. The link arms are generally four in number, located at the positions called "12h00," "3h00," "6h00" and "9h00" positions.

The nacelle 3 includes an air inlet 31, a median section, including in the example two fan cowls 32, and a rear section, including in the example two substantially hemispherical half-portions 33. Finally, the nacelle includes an ejection nozzle 34.

Figure 2A:
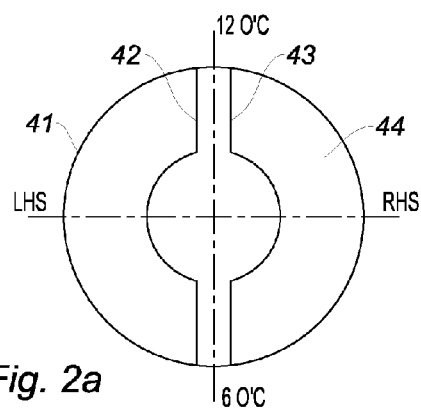
FIGS. 2a and 2b show a schematic view of a section of an intermediate casing of a turbojet engine, when stopped and in operation, respectively.
Figure 2B:
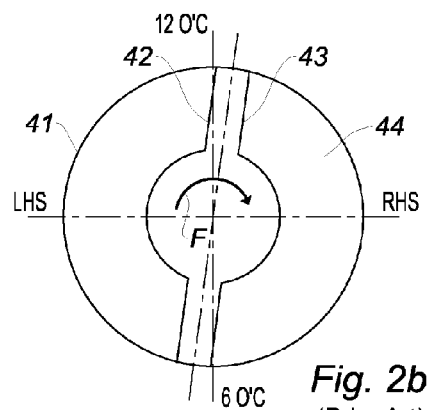

FIGS. 2a and 2b show a schematic section of a fan module of a conventional bypass turbojet engine, the section being located downstream of the fan blades, at the intermediate casing. FIGS. 2a and 2b show the same section, respectively, when the engine is stopped and when it is in operation, in cruising speed. FIGS. 2a and 2b thus show the intermediate casing 41, and the walls 42, 43 of the engine located in the flow of cold air when the engine is in operation. These walls 42, 43 are disposed in an upstream portion of the secondary flow path 44, intended to channel the secondary flow (or cold flow). These walls are constituted, for example, by the outer surfaces of some of the link arms between the hub of the engine and the intermediate casing, in particular the link arms located in the positions called "at 6h00" and "at 12h00." In the example, these walls are located on either side of a vertical plane containing the longitudinal axis of the engine (the longitudinal axis of the engine being normal to the plane of the figures)

The comparison of FIGS. 2a (stopped engine) and 2b (engine in cruising speed) shows the consequences of the "fan twist" effect mentioned above. In FIG. 2b, it can be seen that the walls 42, 43 have an angular offset relative to their position in FIG. 2a. This angular offset is due to the deformation of the engine under the effect of the torsional forces induced by the rotation of the fan (whose direction of rotation in materialized in FIG. 2b by the arrow F). This angular offset depends in particular on the speed of rotation of the fan and can reach values comprised between 2° and 10°, typically between 2° and 5° for small dimension engines, and between 5° and 10° for large dimension engines.

Figure 3A:
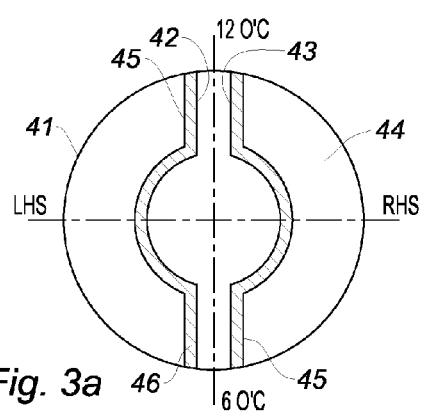
FIGS. 3a and 3b show a schematic view of a section of a propulsion unit, when stopped and in operation, respectively.
Figure 3B:
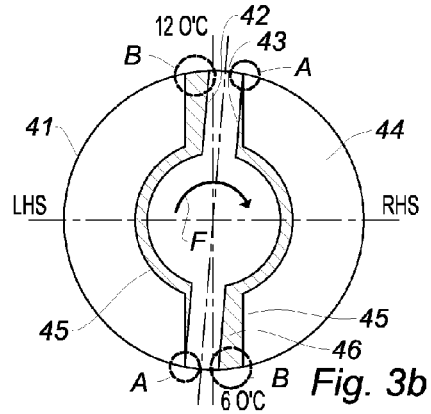

FIGS. 3a and 3b show sections identical to those of FIGS. 2a and 2b, but on which the portions of the inner fixed structure 45 (or IFS 45) of the nacelle located facing the walls 42, 43 have been shown. In the example, the inner fixed structure 45 includes two panels located on either side of a vertical plane containing the longitudinal axis of the engine (the longitudinal axis of the engine being normal to the plane of the Figures). A sealing gasket 46 interposed between the walls 42, 43 and the panels of the inner fixed structure 45, is also shown. This sealing gasket 46 ensures the sealing between the upstream portion (delimited by the intermediate casing) and the downstream portion (delimited by the rear section of the nacelle) of the secondary flow path. The comparison of FIGS. 3a and 3b shows the consequences of the "fan twist" effect on a conventional turbojet engine equipped with its nacelle. Indeed, it is seen in FIG. 3a that the alignment between the portions of the inner fixed structure 45 facing the walls 42, 43 and the walls 42, 43 is correct when the engine is stopped. In these conditions, the gasket 46 has a substantially uniform crushing, and the aerodynamic qualities of the secondary flow path 44 are maximal. When the engine is in operation, the "fan twist" effect involves an angular deformation essentially on the engine: the rear section of the nacelle, and therefore the inner fixed structure 45, is little or not subjected to the forces induced by the rotation of the fan blades.

When the engine is in operation, it is therefore produced an angular offset between the walls 42, 43 and the inner fixed structure 45, which results in a very uneven crushing of the gasket 46. As observed in FIG. 3b, the gasket 46 undergoes a very high compression in the areas A where the distance between the walls 42, 43 and the inner fixed structure decreases due to the angular deformation of the engine. Conversely, the gasket 46 undergoes a zero or very low compression in the areas B where the distance between the walls 42, 43 and the inner fixed structure increases.

These compression forces on the gasket, generating very unevenly distributed crushing values, represent a major disadvantage because it is necessary to provide for a gasket capable of undergoing very large deformation amplitudes. Further, the gasket must be able to provide a satisfactory sealing over the entire deformation range. Thus, the gasket must have satisfactory sealing performances for deformation values comprised between 10% and 60%, while the optimum deformation of a gasket normally corresponds to a value of about 35%. The need to provide for a gasket that takes account of all these constraints impacts both the cost and the weight of the assembly.

Otherwise, besides the disadvantages observed above, the angular offset between the walls 42, 43 of the engine and the inner fixed structure 45 also results in a great reduction in the aerodynamic qualities of the secondary flow path. Indeed, this angular offset results, at the interface between the walls 42, 43 and the inner fixed structure 45, in a recess in the surface of the secondary flow path, and, consequently, hampers the aerodynamic continuity of the secondary flow path. It follows a great reduction of the aerodynamic qualities of the secondary flow path.

Figure 4A:
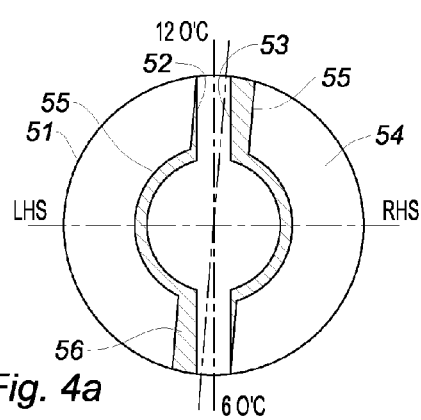
FIGS. 4a and 4b show a schematic view of a section of a propulsion unit in accordance with the present disclosure, when stopped and in operation, respectively.
Figure 4B:
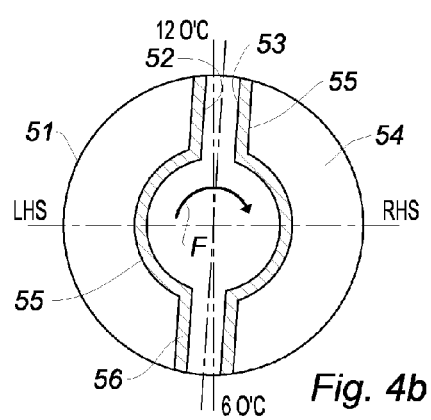

FIGS. 4a and 4b show sections analogous to those of FIGS. 3a and 3b, but carried out on a propulsion unit in accordance with the present disclosure as shown in FIG. 1. FIGS. 4a and 4b thus show an intermediate casing 51, delimiting a downstream portion of a secondary flow path 54, intended to channel the secondary flow. FIGS. 4a and 4b also show the portions of the inner fixed structure 55 (or IFS 55) of the rear section of the nacelle, as well as the gasket 56 interposed between the engine and the inner fixed structure 55. In the example, the inner fixed structure includes two panels located on either side of a vertical plane containing the longitudinal axis of the engine.

In accordance with the present disclosure, the inner fixed is shaped so that its alignment with the engine (and in particular with the walls 52, 53 of the engine) is optimal in the operating condition, and more particularly when the engine is in cruising speed. More precisely, when the engine is stopped, there is an angular offset about the longitudinal axis of the engine (axis corresponding in particular to the rotation axis of the fan and which is normal to the plane of FIGS. 2a, 2b, 3a, 3b, 4a, 4b) between the panels of the inner fixed structure 55 and the walls 52, 53 of the engine, this offset being such that the torsional deformation of the engine in cruising speed, as observed in FIG. 4b, will cancel this angular offset. Thus, the urging of the gasket 56 and the aerodynamic qualities of the secondary flow path 54 will be optimal in cruising speed. It is thus seen in FIG. 4b that the deformation of the gasket 56 is very homogeneous and that there is no longer any recess between the walls 52, 53 and the panels of the inner fixed structure 55. In contrast, the deformation of the gasket 56 is very uneven when the engine is stopped, which can be seen in FIG. 4a. Thus, the urging of the gasket 56 and the aerodynamic qualities are (voluntarily) deteriorated when the engine is stopped. But this voluntary deterioration, on the one hand, has no particular disadvantage and, on the other hand, allows to improve the aerodynamic qualities of the secondary flow path 54 and the urging of the gasket 56 in flight conditions. This in particular allows a gain on the consumption of the engine and, further, allows to dimension the gasket in a less constraining manner.

The initial angular offset (when the engine is stopped) will be, for example, comprised between 2° and 10°, and will be in particular comprised between 2° and 5° for a small size engine, and comprised between 5° and 10° for large size engines.

Although the present disclosure has been described in relation with particular forms, it is in no way limited thereto and that it comprises all the technical equivalents of the means described as well as their combinations if the latter are within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft propulsion unit, including a bypass turbojet engine equipped with a nacelle,
   the bypass turbojet engine including a first portion,
   the nacelle including a second portion,
   the first portion of the bypass turbojet engine and the second portion of the nacelle defining a secondary flow path for channeling a secondary flow,
   a seal being interposed between the nacelle and the bypass turbojet engine,
   wherein the second portion of the nacelle is offset angularly with respect to the first portion of the bypass turbojet engine by an angular offset value about a longitudinal axis of the bypass turbojet engine when the bypass turbojet engine is stopped, and
   wherein a torsional deformation of the bypass turbojet engine in cruising speed cancels the angular offset value and such that the seal has a uniform crushing by the bypass turbojet engine and nacelle when the bypass turbojet engine is in the cruising speed.

2. The aircraft propulsion unit according to claim 1, wherein the first portion is an intermediate casing of the bypass turbojet engine.

3. The aircraft propulsion unit according to claim 1, wherein the second portion is a rear section of the nacelle.

4. The aircraft propulsion unit according to claim 3, wherein the second portion includes an inner fixed structure and an outer fixed structure.

5. The aircraft propulsion unit according to claim 1, wherein the angular offset value is between 2° and 10°.

6. The aircraft propulsion unit according to claim 1, wherein the angular offset value is between 2° and 5°.

7. The aircraft propulsion unit according to claim 1, wherein the angular offset value is between 5° and 10°.

8. An aircraft including the aircraft propulsion unit according to claim 1.

9. The aircraft propulsion unit according to claim 1, wherein the second portion of the nacelle is asymmetric relative to a center vertical axis of the bypass engine when the bypass engine is stopped and in operation.

10. A method of manufacturing an aircraft propulsion unit, including a bypass turbojet engine equipped with a nacelle, the bypass turbojet engine including a first portion, the nacelle including a second portion, the first portion of the bypass turbojet engine and the second portion of the nacelle defining a secondary flow path for channeling a secondary flow, the method comprising:
  mounting the nacelle to the bypass turbojet engine at an angular offset value so that the second portion of the nacelle is offset angularly about a longitudinal axis of the bypass turbojet engine relative to the first portion of the bypass turbojet engine; and
  interposing a seal between the nacelle and the bypass turbojet engine,
  wherein a torsional deformation of the bypass turbojet engine in cruising speed cancels the angular offset value such that the seal has a uniform crushing by the bypass turbojet engine and nacelle when the bypass turbojet engine is in the cruising speed.

11. The method according to claim 10, wherein the first portion is an intermediate casing of the bypass turbojet engine.

12. The method according to claim 10, wherein the second portion is a rear section of the nacelle.

13. The method according to claim 12, wherein the second portion includes an inner fixed structure and an outer fixed structure.

14. The method according to claim 10, wherein the angular offset value is between 2° and 10°.

15. The method according to claim 10, wherein the angular offset value is between 2° and 5°.

16. The method according to claim 10, wherein the angular offset value is between 5° and 10°.

* * * * *